United States Patent
Stafford

(10) Patent No.: US 6,511,272 B2
(45) Date of Patent: Jan. 28, 2003

(54) TRUCK BED CARGO HOLDER

(76) Inventor: John Stafford, 14 Willet Ct., Erial, NJ (US) 08081

( * ) Notice: Subject to any disclaimer, the term of this patent is extended or adjusted under 35 U.S.C. 154(b) by 0 days.

(21) Appl. No.: 09/909,770

(22) Filed: Jul. 20, 2001

(65) Prior Publication Data

US 2002/0009347 A1 Jan. 24, 2002

Related U.S. Application Data

(60) Provisional application No. 60/219,604, filed on Jul. 21, 2000.

(51) Int. Cl.[7] .................................................. B60P 7/15
(52) U.S. Cl. ........................ 410/121; 410/129; 410/143
(58) Field of Search ................................. 410/121, 129, 410/140, 141, 142, 143, 144, 150, 151; 224/403, 404; 296/24.1, 37.6; 220/507, 529, 530, 552

(56) References Cited

U.S. PATENT DOCUMENTS

| | | | |
|---|---|---|---|
| 4,236,854 A | * 12/1980 | Rogers ........................ 410/121 |
| 4,444,427 A | 4/1984 | Martin | |
| 4,772,165 A | * 9/1988 | Bartkus ....................... 410/139 |
| 5,265,993 A | 11/1993 | Wayne | |
| 5,427,487 A | * 6/1995 | Brosfske ...................... 410/121 |
| 5,697,742 A | * 12/1997 | House ......................... 410/127 |
| 5,788,310 A | 8/1998 | McKee | |
| 5,975,819 A | * 11/1999 | Cola ........................... 410/129 |
| 6,077,007 A | * 6/2000 | Porter et al. ................. 410/140 |
| 6,089,804 A | * 7/2000 | Bartelt ........................ 410/140 |
| 6,174,116 B1 | * 1/2001 | Brand ......................... 410/140 |
| 6,206,624 B1 | * 3/2001 | Brandenburg ............... 410/132 |

* cited by examiner

Primary Examiner—Stephen T. Gordon
(74) Attorney, Agent, or Firm—Matthew J. Peirce

(57) ABSTRACT

A new and improved cargo holder for pickup trucks is disclosed which is adaptable to a pickup truck bed of any size. The cargo holder is designed to hold and maintain cargo within the bed of a pickup truck without ropes and/or ties. The cargo holder could be manufactured from aluminum, galvanized steel, or heavy gauge plastic.

6 Claims, 1 Drawing Sheet

TRUCK BED CARGO HOLDER

Applicant claims the benefit of the previously filed provisional application 60/219,604, filed Jul. 21, 2000.

I. BACKGROUND OF THE INVENTION

The present invention concerns that of a new and improved cargo holder for pickup trucks which is adaptable to any size truck.

II. DESCRIPTION OF THE PRIOR ART

U.S. Pat. No. 5,788,310, issued to McKee, discloses a new pickup truck bed liner dividing system for preventing cargo of various shapes and sizes from moving within a pickup truck bed.

U.S. Pat. No. 5,265,993, issued to Wayne, discloses a truck bed divider system for placement within the bed of a truck that includes at least one primary divider and at least one secondary divider.

U.S. Pat. No. 4,444,427, issued to Martin, discloses a support apparatus for auxiliary structural elements in a pickup truck.

III. SUMMARY OF THE INVENTION

The present invention concerns that of a new and improved cargo holder for pickup trucks which is adaptable to any size truck. The apparatus of the present invention holds and maintains cargo within the bed of a pickup truck without ropes and/or ties. The present invention could be manufactured from aluminum, galvanized steel, or heavy gauge plastic.

There has thus been outlined, rather broadly, the more important features of a cargo holder for pickup trucks in order that the detailed description thereof that follows may be better understood and in order that the present contribution to the art may be better appreciated. There are, of course, additional features of the cargo holder for pickup trucks that will be described hereinafter and which will form the subject matter of the claims appended hereto.

In this respect, before explaining at least one embodiment of the cargo holder for pickup trucks in detail, it is to be understood that the cargo holder for pickup trucks is not limited in its application to the details of construction and to the arrangements of the components set forth in the following description or illustrated in the drawings. The cargo holder for pickup trucks is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present cargo holder for pickup trucks. It is important, therefore, that the claims be regard as including such equivalent constructions insofar as they do not depart from the spirit and scope of the present invention.

It is therefore an object of the present invention to provide a cargo holder for pickup trucks which has all of the advantages of the prior art and none of the disadvantages.

It is another object of the present invention to provide a cargo holder for pickup trucks which may be easily and efficiently manufactured and marketed.

It is another object of the present invention to provide a cargo holder for pickup trucks which is of durable and reliable construction.

It is yet another object of the present invention to provide a cargo holder for pickup trucks which is economically affordable and available to the buying public.

It is yet another object of the present invention to provide a cargo holder for pickup trucks which provides additional benefits not present in the prior art.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
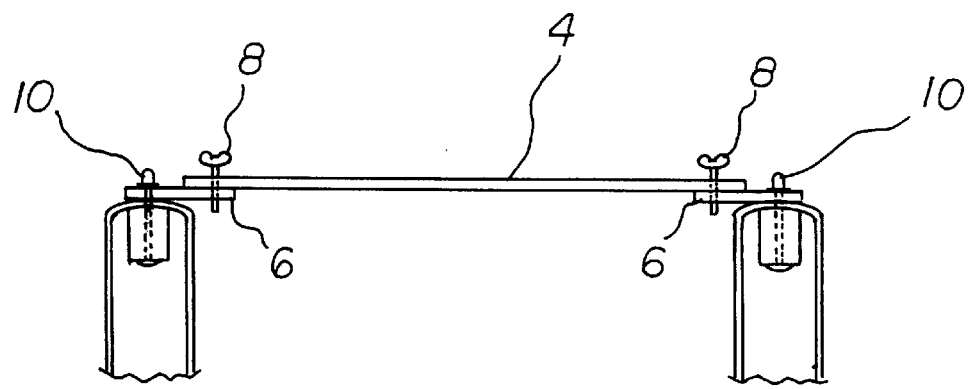
FIG. 1 shows a side view of the method of connection of a main slat to the walls of a truck bed.

FIG. 1 shows a side view of the method of connection of a main slat to the walls of a truck bed. The main slat shown can represent either front main slat 2 or rear main slat 4. The main slat shown has two ends, a first end and a second end. The main slat, like all other slats used with the present invention, would be approximately four inches wide and ¼ inch thick, with a variable length, depending on the width of a particular truck bed. It is likely, however, that both main slats would have to be at least four feet in length.

The entire length of both main slats would have step holes or slots along its entire length approximately one inch apart. The sum total of the step holes or slots would be located in linear fashion and would be equidistant from each edge of each main slat.

Both the first end and the second end of each main slat would be attached to a bracket 6 via a thumb screw 8. Each bracket 6 would have a first end and a second end. Each thumb screw 8 would be inserted through both an end of a main slat and a first end of a bracket. At the same time, the second end of each bracket 6 would be fixedly mounted to the top edge of a truck bed with a toggle bolt 10. As a result, both front main slat 2 and rear main slat 4 would be the only two slats used with the present invention designed to be permanent fixed in place, while the remaining slats would be adjustable, depending on a specific cargo load.

Figure 2:
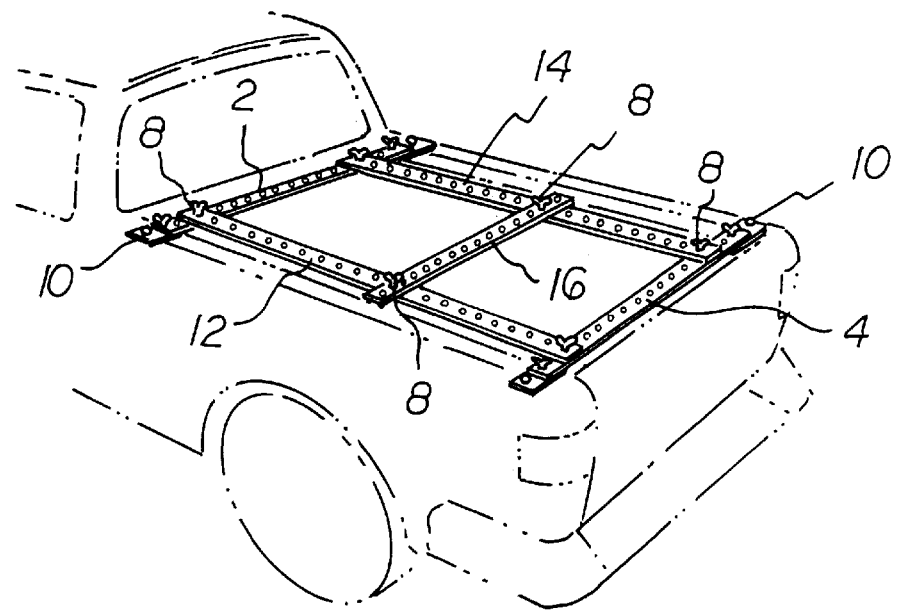
FIG. 2 shows a perspective view of the present invention in use.

FIG. 2 shows a perspective view of the present invention in use. As previously discussed, front main slat 2 and rear main slat 4 are shown to be fixedly mounted to the top edge of a truck bed with a toggle bolt 10. To the top surface of both front main slat 2 and rear main slat 4 would be located left side slat 12 and right side slat 14. Left side slat 12 and right side slat 14 would have varying length, depending on the length of a particular truck bed, but at a minimum, would likely need to be at least six feet long. Left side slat 12 and right side slat 14 would also have step holes or slots along its entire length approximately one inch apart. The plurality of step holes or slots would be located in linear fashion and would be equidistant from each edge of each main slat.

In order to removable affix one of the side slats to a main slat, a user would merely need to insert an individual thumb screw 8 through both a step hole or slot located in a side slat and a step hole or slot located in a main slat.

To the top surface of both left side slat 12 and right side slat 14 would be located adjuster slat 16. Adjuster slat 16 would have varying length, depending on the width of a particular truck bed, but at a minimum, would likely need to be at least four feet long. Adjuster slat 16 would also have step holes or slots along its entire length approximately one inch apart. The plurality of step holes or slots would be located in linear fashion and would be equidistant from each edge of each main slat.

In order to removable affix the adjuster slat 16 to one or both of the side slats, a user would merely need to insert an individual thumb screw 8 through both a step hole or slots located in the adjuster slat 16 and a step hole or slot located in a side slat.

The present invention would be a great improvement over existing art in that it would allow a user to adjust the various slats to accommodate loads of varying weight and configuration. The present invention would allow a user to not need to use ropes and ties, which typically take a longer time to properly set a cargo load in a truck bed.

What I claim as my invention is:

1. A cargo holder for pickup trucks comprising:
   (a) a front main slat having a first end and a second end, the front main slat being at least four feet in length, the front main slat being approximately four inches in width and approximately one-fourth inch thick, the front main slat having a plurality of holes evenly spaced out in linear fashion,
   (b) a rear main slat having a first end and a second end, the rear main slat being at least four feet in length, the rear main slat being approximately four inches in width and approximately one-fourth inch thick, the rear main slat having a plurality of holes evenly spaced out in linear fashion,
   (c) a left side slat having a first end and a second end, the left side slat being at least six feet in length, the left side slat being approximately four inches in width and approximately one-fourth inch thick, the left side slat having a plurality of holes evenly spaced out in linear fashion, the first end of the left side slat being connected to the front main slat, the second end of the left side slat being connected to the rear main slat,
   (d) a right side slat having a first end and a second end, the right side slat being at least six feet in length, the right side slat being approximately four inches in width and approximately one-fourth inch thick, the right side slat having a plurality of holes evenly spaced out in linear fashion, the first end of the right side slat being connected to the front main slat, the second end of the right side slat being connected to the rear main slat,
   (e) an adjuster slat having a first end and a second end, the adjuster slat being at least four feet in length, the adjuster slat being approximately four inches in width and approximately one-fourth inch thick, the adjuster slat having a plurality of holes evenly spaced out in linear fashion, the first end of the adjuster slat being connected to the left side slat, the second end of the adjuster, slat being connected to the right side slat,
   (f) a first attachment means for connecting first end and the second end of the front main slat to top edges of side walls of a pickup truck, and
   (g) a second attachment means for connecting the first end and the second end of the rear main slat to top edges of side walls of a pickup truck.

2. A cargo holder for pickup trucks according to claim 1 wherein the first attachment means further comprises:
   (a) a pickup truck, the pickup truck including a cabin area and a pickup truck bed, the pickup truck bed having a front side and a rear side,
   (b) a pair of side walls attached to the truck bed, the pair of side walls comprising a left side wall and a right side wall, the left side wall and the right side wall each having a top edge,
   (c) a first toggle bolt and a second toggle bolt, the first toggle bolt and the second toggle bolt each having a first end and a second end, the first end of the first toggle bolt attached to the top edge of the left side wall near the front side of the pickup truck bed, the first end of the second toggle bolt attached to the top edge of the right side wall near the front side of the pickup truck bed,
   (d) a first bracket having a first end and a second end, the first end of the first bracket being attached to the second end of the left toggle bolt,
   (e) a second bracket having a first end and a second end, the first end of the second bracket being attached to the second end of the right toggle bolt,
   (f) whereby the first end of the front main slat would be removably attached to the second end of the first bracket, and further whereby the second end of the front main slat would be removably attached to the second end of the second bracket.

3. A cargo holder for pickup trucks according to claim 1 wherein the second attachment means further comprises:
   (a) a pickup truck, the pickup truck including a cabin area and a pickup truck bed, the pickup truck bed having a front side and a rear side,
   (b) a pair of side walls attached to the truck bed, the pair of side walls comprising a left side wall and a right side wall, the left side wall and the right side wall each having a top edge,
   (c) a first toggle bolt and a second toggle bolt, the first toggle bolt and the second toggle bolt having a first end and a second end, the first end of the first toggle bolt attached to the top edge of the left side wall near the rear side of the pickup truck bed, the first end of the second toggle bolt attached to the top edge of the right side wall near the rear side of the pickup truck bed,
   (d) a first bracket having a first end and a second end, the first end of the first bracket being attached to the second end of the left toggle bolt, (e) a second bracket having a first end and a second end, the first end of the second bracket being attached to the second end of the right toggle bolt, (f) whereby the first end of the rear main slat would be removably attached to the second end of the first bracket, and further whereby the second end of the rear main slat would be removably attached to the second end of the second bracket.

4. A cargo holder for pickup trucks according to claim 1 wherein the first end of the left side slat is connected to the front main slat by a thumb screw, and further wherein the second end of the left side slat is connected to the rear main slat by, thumb screw.

5. A cargo holder for pickup trucks according to claim 1 wherein the first end of the right side slat is connected to the front main slat by a thumb screw, and further wherein the second end of the right side slat is connected to the rear main slat by a thumb screw.

6. A cargo holder for pickup trucks according to claim 1 wherein the first end of the adjuster slat is connected to the left side slat by a thumb screw, and further wherein the second end of the adjuster slat is connected to the right side slat by a thumb screw.

* * * * *